(12) United States Patent
Sauer et al.

(10) Patent No.: US 7,095,134 B2
(45) Date of Patent: Aug. 22, 2006

(54) ERROR RECOGNITION FOR POWER RING

(75) Inventors: Bodo Sauer, Vaihingen (DE); Ralf Rehder, Hogel (DE)

(73) Assignee: Rheinmetall Landsysteme GmbH, Kiel (DE)

( * ) Notice: Subject to any disclaimer, the term of this patent is extended or adjusted under 35 U.S.C. 154(b) by 1 day.

(21) Appl. No.: 10/880,462

(22) Filed: Jul. 1, 2004

(65) Prior Publication Data

US 2005/0001431 A1 Jan. 6, 2005

(30) Foreign Application Priority Data

Jul. 2, 2003 (DE) ................. 103 29 914

(51) Int. Cl.
| | |
|---|---|
| *B60L 1/00* | (2006.01) |
| *B60L 3/00* | (2006.01) |
| *H02J 3/00* | (2006.01) |
| *H02J 1/00* | (2006.01) |
| *F02D 29/06* | (2006.01) |

(52) U.S. Cl. .................. 307/10.1; 307/38; 307/29; 290/7

(58) Field of Classification Search ............... 290/1 R, 290/40 R, 7; 307/10.1, 10.7, 10.8, 29, 38, 307/36, 31, 11
See application file for complete search history.

(56) References Cited

U.S. PATENT DOCUMENTS

| | | | | |
|---|---|---|---|---|
| 3,249,709 A | * | 5/1966 | Rickert | 307/36 |
| 3,474,256 A | * | 10/1969 | Begent | 307/18 |
| 4,051,383 A | * | 9/1977 | Dola | 307/11 |
| 5,604,385 A | * | 2/1997 | David | 307/52 |
| 5,648,688 A | * | 7/1997 | Nagatani et al. | 307/10.1 |
| 6,127,741 A | | 10/2000 | Matsuda et al. | |
| 6,552,443 B1 | * | 4/2003 | Johnke et al. | 307/10.1 |
| 6,567,522 B1 | * | 5/2003 | Blackburn | 379/413 |
| 6,873,063 B1 | * | 3/2005 | Appleford et al. | 307/149 |
| 2004/0051383 A1 | * | 3/2004 | Clark et al. | 307/36 |
| 2004/0183375 A1 | * | 9/2004 | Hayes | 307/10.1 |
| 2004/0201281 A1 | * | 10/2004 | Ma et al. | 307/38 |

FOREIGN PATENT DOCUMENTS

| | | |
|---|---|---|
| DE | 19916452 C2 | 10/2000 |
| EP | 1044851 A2 | 10/2000 |

OTHER PUBLICATIONS

International Search Report Issued in the Corresponding Application EP 04 01 1120 Completed Sep. 13, 2005.

* cited by examiner

*Primary Examiner*—Julio C. Gonzalez
(74) *Attorney, Agent, or Firm*—Griffin & Szipl, P.C.

(57) ABSTRACT

A power ring device that includes: a ring conductor; a plurality of controllers, each controller being connected to the ring conductor and includes a first control unit; a plurality of paired pick ups, wherein each pair connects either an electrical consumer device or an electrical power supply to the ring conductor and to one of the plurality of controllers, wherein a first pair of pick ups of a first controller is connected to a first power supply; and a plurality of current sensor signal lines connecting each control unit to form a data connection; wherein each controller has a right and left side, a right sided and left sided switch elements; and a right sided and left sided current sensors connected so that a first current value measured by the left sided current sensor of the first controller is transmitted as data to the first control unit of a second controller.

5 Claims, 5 Drawing Sheets

ERROR RECOGNITION FOR POWER RING

This application claims priority from German Patent Application No. 103 29 914.9, filed Jul. 2, 2003, the entire disclosure of which is incorporated herein by reference.

FIELD OF THE INVENTION

The invention relates to an improvement in a power ring device, such as would be used in a military vehicle or non-military vehicle, for supplying electrical power to various electrical consuming devices incorporated within the vehicle. Specifically, the power ring device constructed in accordance with the present invention includes an errors recognition feature with a mechanism for compensating for any electrical error occurring in the power ring device.

BACKGROUND OF THE INVENTION

It is known that to supply devices with electrical energy, as individual components and consumers of electrical power in a vehicle such as a military vehicle, a so-called "power ring" is frequently employed. A power ring is a ring conductor that transports output energy and that connects each electrically consuming device with a power generator, which is different from star-shaped electrical connections that can be employed to connect each electricity consuming device (also referred to as an "electrical consumer") with a generator.

A short circuit in the ring conductor of the conventional power ring has the disadvantage that all electrical consumers connected to the power ring are no longer supplied with electrical power. Consequently, a repair shop is then sought so that the error causing the short circuit in the power ring can be addressed and fixed.

Military vehicles, however, have special requirements and it is an undesirable shortcoming that the internal electrical current supply for all connected devices should fail due to a simple short circuit. Furthermore, repair shops are not always readily available in places where military vehicles may travel. To address this problem, known embodiments of the prior art provide, for example, division of the power ring into individual segments by employing a power-ring controller. Thus, energy consuming devices supplied by the power ring with electrical power are connected to different segments of the power ring. When a short circuit occurs in one segment, only those devices that are connected to this one malfunctioning segment are impaired and fail, while those devices connected to the other isolated segments of the power ring are not affected by the short circuit and continue to be supplied with electrical energy and remain functioning.

In DE 199 16 452 C2 to Joehnke et al., a device is disclosed for a power ring employing a ring conductor in a military vehicle, in order to supply electricity to various devices. This prior art power ring device includes several controllers functioning as oversight and switch devices that are connected along, and to, the ring conductor. The prior art power ring device disclosed by Joehnke et al. also includes additional component devices for the oversight and control of the ring conductor, wherein security is adjusted by means of a number of controlled switches so that ring conductor segments to the left or right of a pick-up controller can be closed or shut off.

After a failure caused by a short circuit in the ring conductor, for example, the power ring is subsequently completely shut off. In other words, a short in any segment of the ring conductor causes the entire power ring to cease conducting power. Subsequently, by means of successive switching, the failing conductor segment is identified and decoupled from the power ring. However, this technique of isolating the failed conductor segment, by systematically testing each segment while the ring conductor is unable to conduct electricity has disadvantages. In particular, it is a disadvantage that the power ring, in a case of electrical failure (i.e., short circuit), must be subsequently shut off completely, thereby interrupting the energy supply to all of the connected electrically consuming devices. In addition, the power ring device disclosed by Joehnke et al. cannot readily locate failures that are sporadic failures. The Joehnke et al. power ring can only localize an electrical failure that persists for a given period of time.

SUMMARY OF THE INVENTION

An object of the present invention is to improve failure recognition of a ring conductor element of a power ring.

The present invention endeavors to overcome the limitations of the prior art power ring device. More particularly, the present invention solves the problem of detecting and compensating for a limited electrical failure of a ring conductor element of a power ring by measuring the in and out flowing electrical current of each ring conductor element or segment in the power ring. By differentiating the measured electrical current values, the electrical failure of the ring conduction element can be immediately recognized when the differential current is not equal to zero, which corresponds to the condition that there is a short circuit.

One advantage of the present invention lies in that the previously experienced disadvantage of the prior art power ring, in which there is a long time period delay while the failed conductor segment is identified and isolated which requires successive powering up of the power ring after an electrical failure, can be avoided. In addition, the power ring device in accordance with the present invention is able to measure the electrical power consumption of the individual connected electrical energy consumers that are connected to the power ring.

Thus, in accordance with the present objectives, the present invention provides a first apparatus embodiment, specifically, a power ring device in a military vehicle for supplying electrical power to electrical consuming devices of the vehicle. The power ring device includes: (a) a ring conductor; (b) a plurality of controllers operating as control and switching devices, wherein each controller is connected to the ring conductor and each controller includes a first control unit; (c) a plurality of paired pick ups disposed on the ring conductor, wherein each pair of pick ups connects either an electrical consumer device or an electrical power supply to the ring conductor and to one of the plurality of controllers, wherein a first pair of pick ups of a first controller is connected to a first power supply; and (d) a plurality of current sensor signal lines connecting each control unit of the plurality of controllers so as to form a data connection between the controllers that supervise and control transmission of electrical power along the ring conductor. Each controller further comprises: i. a right side and a left side, and each controller includes a right sided switch element and a left sided switch element connected to the control unit and the ring conductor; and ii. a right sided current sensor and a left sided current sensor connected to the ring conductor, to the first control unit, and to the plurality of current sensor signal lines so that a first current value measured by the left sided current sensor of the first controller is transmitted as data to the first control unit of a second controller.

In accordance with a second apparatus embodiment of the present invention, the plurality of controllers operate together to provide an intelligent control unit for controlling the transmission of electrical power from the first power supply to a first current consumer connected by a second pair of pick ups of a second controller to the ring conductor, wherein the intelligent control unit operates to maintain stable transmission of electrical power to the first current consumer by isolating a short circuit or a power surge in the ring conductor.

In accordance with a third apparatus embodiment of the present invention, the control units of the plurality of controllers operate together as control nodes to provide an intelligent control unit for controlling the transmission of electrical power from the first power supply to a first current consumer connected by a second pair of pick ups of a second controller to the ring conductor, wherein the intelligent control unit operates to maintain stable transmission of electrical power to the first current consumer by isolating an electrical disturbance in the ring conductor, wherein the electrical disturbance is either a short circuit or a power surge.

In accordance with a fourth apparatus embodiment of the present invention, each first control unit provides a control node for an integrated intelligent control unit, and each first control unit comprises a device for voltage measurement and a device for conduction protection with status indication.

In accordance with a fifth apparatus embodiment of the present invention, the integrated intelligent control unit includes a master controller connected to send control signals to each first control unit.

In accordance with a sixth apparatus embodiment of the present invention, each first control unit comprises a device for voltage measurement and a device for conduction protection with status indication.

In accordance with a seventh apparatus embodiment of the present invention, each pick up controller includes one pair of pick ups forming a connection to the ring conductor and to a component selected from the group consisting of an electrical consumer, a power supply and the first power supply so that the right sided switch element is connected to the ring conductor to the right of the connection and the left sided switch element is connected to the ring conductor to the left of the connection.

In accordance with an eighth apparatus embodiment of the present invention, the right sided switch element is connected to the ring conductor between the right sided current sensor and the one pair of pick ups, and the left sided switch element is connected to the ring conductor between the left sided current sensor and the one pair of pick ups.

In accordance with a ninth apparatus embodiment of the present invention, the data connection connects the control nodes so that measured current values sensed by the right sided current sensors and the left sided current sensors are exchanged with adjacent control nodes.

In accordance with a tenth apparatus embodiment of the present invention, each first control unit is connected to receive a control signal from a higher order control device.

In accordance with an eleventh apparatus embodiment of the present invention, the right sided current sensor and the left sided current sensor of each pick up controller are disposed for measuring electrical current values in conducting lines of the ring conductor and the one pair of pick ups.

In accordance with the present objectives, the present invention provides a vehicle. The vehicle that includes: (A) a first power supply; (B) one or more electrical consuming devices; and (C) a power ring device connected to receive electrical power from the first power supply and connected to transmit electrical power to the one or more electrical consuming devices. The power ring device comprises: i. a ring conductor; ii. a plurality of controllers operating as control and switching devices, wherein each controller is connected to the ring conductor and each controller includes a first control unit; iii. a plurality of paired pick ups disposed on the ring conductor, wherein each pair of pick ups connects either an electrical consumer device or an electrical power supply to the ring conductor and to one of the plurality of controllers, wherein a first pair of pick ups of a first controller is connected to the first power supply; and iv. a plurality of current sensor signal lines connecting each control unit of the plurality of controllers so as to form a data connection between the controllers that supervise and control transmission of electrical power along the ring conductor. Each controller further comprises: a. a right side and a left side, and each controller includes a right sided switch element and a left sided switch element connected to the control unit and the ring conductor; and b. a right sided current sensor and a left sided current sensor connected to the ring conductor, to the first control unit, and to the plurality of current sensor signal lines so that a first current value measured by the left sided current sensor of the first controller is transmitted as data to the first control unit of a second controller.

In accordance with a thirteen embodiment of the present invention, the control units of the plurality of controllers operate together as control nodes to provide an intelligent control unit for controlling the transmission of electrical power from the first power supply to a first current consumer connected by a second pair of pick ups of a second controller to the ring conductor, wherein the intelligent control unit operates to maintain stable transmission of electrical power to the first current consumer by isolating an electrical disturbance in the ring conductor, wherein the electrical disturbance is either a short circuit or a power surge.

In accordance with a fourteenth embodiment of the present invention, each pick up controller includes one pair of pick ups forming a connection to the ring conductor and to a component selected from the group consisting of an electrical consumer, a power supply and the first power supply so that the right sided switch element is connected to the ring conductor to the right of the connection and the left sided switch element is connected to the ring conductor to the left of the connection.

In accordance with a fifteenth embodiment of the present invention, the integrated intelligent control unit includes a master controller connected to send control signals to each first control unit.

In accordance with a sixteenth embodiment of the present invention, the right sided switch element is connected to the ring conductor between the right sided current sensor and the one pair of pick ups, and the left sided switch element is connected to the ring conductor between the left sided current sensor and the one pair of pick ups.

In accordance with a seventeenth embodiment of the present invention, the right sided current sensor and the left sided current sensor of each pick up controller are disposed for measuring electrical current values in conducting lines of the ring conductor and the one pair of pick ups.

In accordance with an eighteenth embodiment of the present invention, each first control unit comprises a device for voltage measurement and a device for conduction protection with status indication.

In accordance with a nineteenth embodiment of the present invention, the twelfth embodiment is modified so that the vehicle is a military vehicle.

An illustrative example of the present invention is shown schematically in the drawings and is further described as follows. Further objects, features and advantages of the present invention will become apparent from the Detailed Description of the Illustrative Embodiments, which follows, when considered together with the attached drawings.

LIST OF REFERENCE NUMERALS

Figure 1:
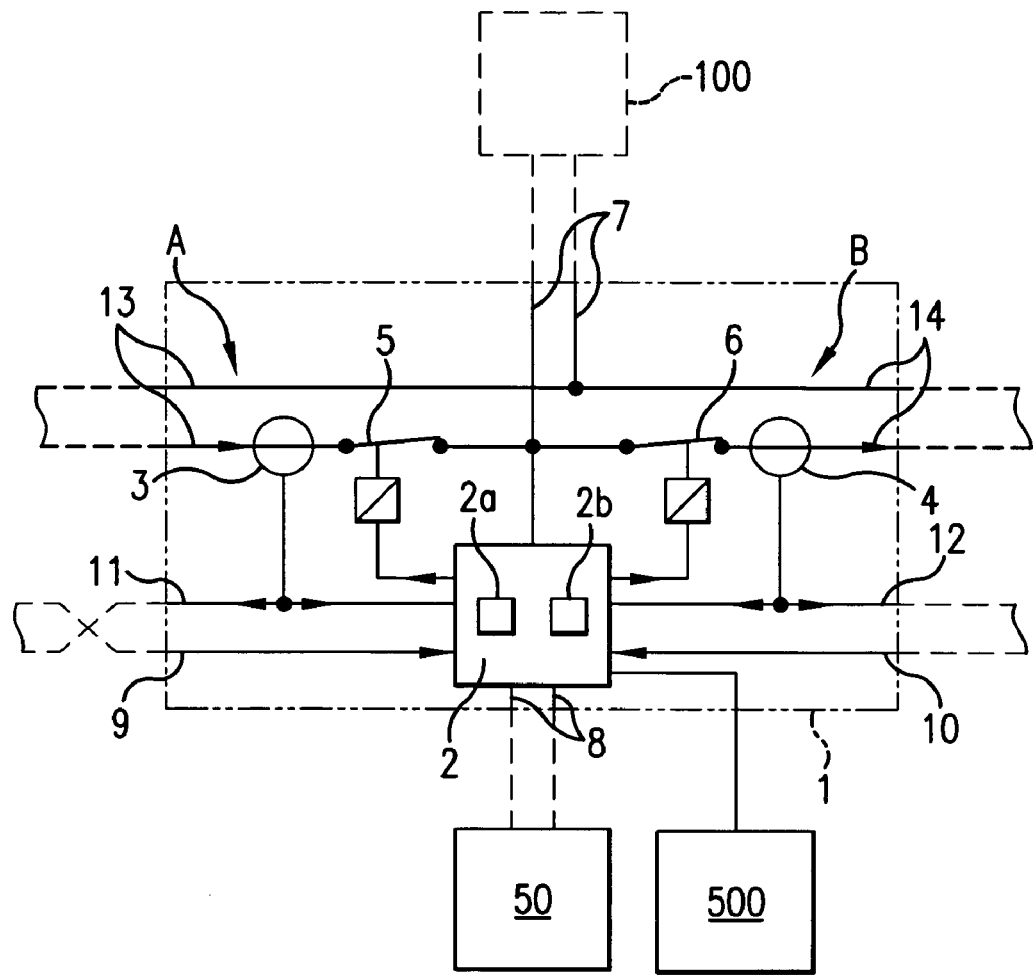
FIG. 1 is a schematic drawing of a pick up controller for measuring current in accordance with the present invention.

1. Pick-up Controller with Housing
2. Control Unit
3. Current Sensor at Side A
4. Current Sensor at Side B
5. Switching Element at Side A
6. Switching Element at Side B
7. Pick-up for Electrical Consumers, or a Power Supply (Plus and Minus)
8. Signal line for Failure Signals and Confirmation
9. Current Sensor Signal line for connecting Neighboring Pick-up Controller to Side A
10. Current Sensor Signal line for connecting Neighboring Pick-up Controller to Side B
11. Current Sensor Signal line for connecting Current Sensor at Side A
12. Current Sensor Signal line for connecting Current Sensor at Side B
13. Ring Conductor Discharge segment at Side A (Plus and Minus)
14. Ring Conductor Discharge segment at Side B (Plus and Minus)

DETAILED DESCRIPTION OF THE PREFERRED EMBODIMENTS

The power ring apparatus of the present invention is described in FIGS. 1 through 4, where like reference characters have been used to label like parts. FIG. 5 illustrates a vehicle 400 that has a power ring device in accordance with the present invention incorporated therein.

Figure 2:
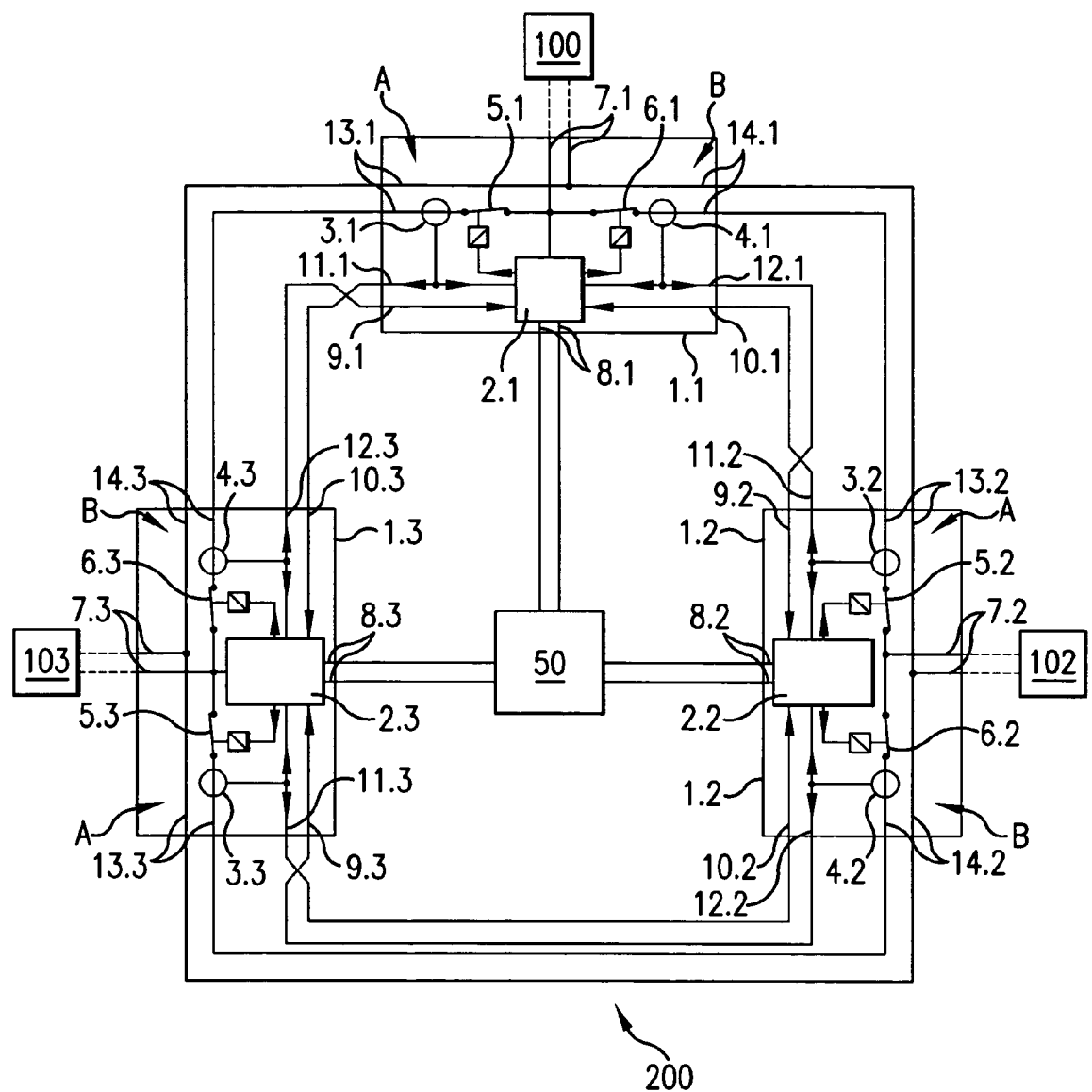
FIG. 2 is a schematic drawing of a power ring with a pick up controller for measuring current in accordance with the present invention.

FIG. 1 schematically shows a pick up controller in accordance with the present invention, which includes a pick up controller 1 with a housing that houses the following components: a control unit 2; current sensors 3 and 4; and switch elements 5 and 6, which are connected with various electrical conductors 9 to 14 (also referred to as "lines" or "wires") as illustrated. The paired pick ups 7, of either a power supply or an electrical consumer, are connected to conductor lines 13 and 14. Conductor lines 13 and 14 together form a conductor ring 13, 14. Signal lines 8, for conducting failure signals to a failure indicator 50, are connected to the control unit 2. Current sensor signal lines 9 and 10 are provided to connect the control unit 2 with neighboring pick up controllers such as shown in FIG. 2, or as the case may be, accompanying left and right controller units (see FIG. 2). Current sensor signal lines 11 and 12 connect the current sensors 3, 4 with neighboring pick up controllers and with the left side A, or, as the case may be, the right side B of the control unit 2. Optionally, the control unit 2 of pick up controller 1 can be connected to receive control signals from a master controller 500.

The current sensors 3 and 4 measure electrical current flowing within the pick up controller 1. Current sensor 3 measures electrical current flowing in conductor line 13 at the left side A of the controller 1, whereas current sensor 4 measures electrical current flowing in the conductor line 14 at the right side B of the controller 1. The measured current values as measured by current sensor 3 are transmitted as data (i.e., signal input) to the left side of the control unit 2 and to a neighboring pick up controller connected to the left side A of the pick up controller 1. The measured current values as measured by current sensor 4 are transmitted as data (i.e., signal input) to the right side of the control unit 2 and to a neighboring pick up controller connected to the right side B of the pick up controller 1.

For example, as shown in the power ring of FIG. 2, current sensor line 11.1 of pick up controller 1.1 connects current sensor 3.1 to the current sensor 4.3 of neighboring pick up controller 1.3 and to the left side of control unit 2.1. On the other hand, the current sensor line 12.1 connects current sensor 4.1 to the current sensor 3.2 of neighboring pick up controller 1.2 and to the right side of control unit 2.1. In the example illustrated in FIG. 2, the control units 2.1, 2.2 and 2.3 serve as interconnected control nodes connected together via a plurality of current sensor signal lines 9.1, 9.2, 9.3, 10.1, 10.2, 10.3, 11.1, 11.2, 11.3, 12.1, 12.2 and 12.3 so as to form a data connection for transmitting measured current data between adjacent control nodes. With this interconnected structure, the control units or nodes 2.1, 2.2 and 2.3 can communicate measured current information to each other for electrical power transmission control purposes so that short circuits, power surges and other disturbances in the ring conductor can be isolated from the remainder of the power ring circuit.

FIG. 2 shows the switchable connection of three pick up controllers 1.1, 1.2, 1.3 to form a power ring using current sensor signal lines and the electrical power conducting ring conductor 13, 14. As shown in FIG. 1, the ring conductor 13, 14 includes a first segment provided by conductor lines 13 that provides a ring conductor discharge side A and a second segment provided by conductor lines 14 that provides a ring conductor discharge side B. Those skilled in the art would realize, from FIG. 1, that ring conductor 13, 14 of the power ring conducts the electrical current provided by a power source and used to energize electrically consuming devices connected to the power ring, whereas the current sensor signal lines 9, 10, 11, 12 serve to communicate data regarding electrical current flowing in neighboring pick up controllers. More particularly, current sensor signal lines 9 and 10 of pick up controller 1 serve to transmit sensed current signals flowing from neighboring pick up controllers to the pick up controller 1. On the other hand, current sensor signal lines 11 and 12 serve to communicate measured current data, as measured by current sensors 3 and 4, to neighboring pick up controllers when current is flowing through pick up controller 1.

Figure 3:
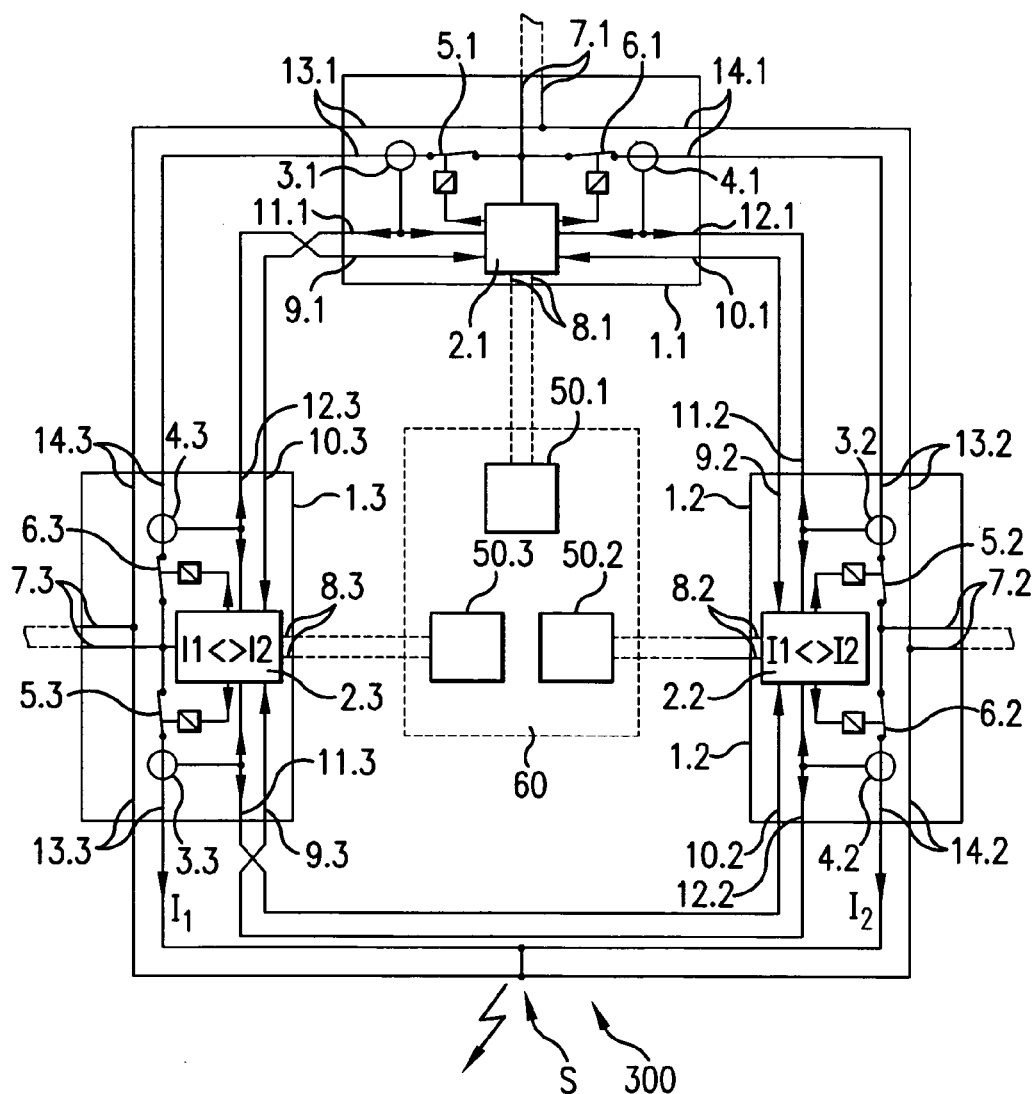
FIG. 3 is a schematic drawing showing how a power ring with a pick up controller for measuring current operates during electrical failure (i.e., a short circuit).

In accordance with the present invention, as illustrated in FIGS. 2 and 3, when there are multiple pick up controllers connected to the power ring, then there are corresponding multiples for each current sensor line and ring conductor segments. For example, in the power ring circuit shown in FIGS. 2 and 3 there are three pick up controllers 1.1, 1.2 and 1.3. Therefore, in the embodiment shown in FIGS. 2 and 3 there are twelve current sensor signal lines 9.1, 9.2, 9.3, 10.1, 10.2, 10.3, 11.1, 11.2, 11.3, 12.1, 12.2 and 12.3. Likewise, there are six ring conductor segments 13.1, 13.2, 13.3, 14.1, 14.2 and 14.3 that form the ring conductor of the power ring. Each pick up controller is constructed to include its own control unit, current sensors and switches. Each control unit operates to receive measured electrical current signals from the two current sensors connected to control unit and housed by the pick up controller, and to send signals for operating the associated switches connected to the control unit and also housed by the pick up controller. Therefore, pick up controller 1.1 includes control unit 2.1, current sensors 3.1 and 4.1 both connected to the control unit 2.1, and switches 5.1 and 6.1 also connected to control unit 2.1. Pick up controller 1.2 includes control unit 2.2, current sensors 3.2 and 4.2 both connected to the control unit 2.2, and switches 5.2 and 6.2 also connected to control unit 2.2. Pick up controller 1.3 includes control unit 2.3, current sensors 3.3 and 4.3 both connected to the control unit 2.3, and switches 5.3 and 6.3 also connected to control unit 2.3.

Figure 4:
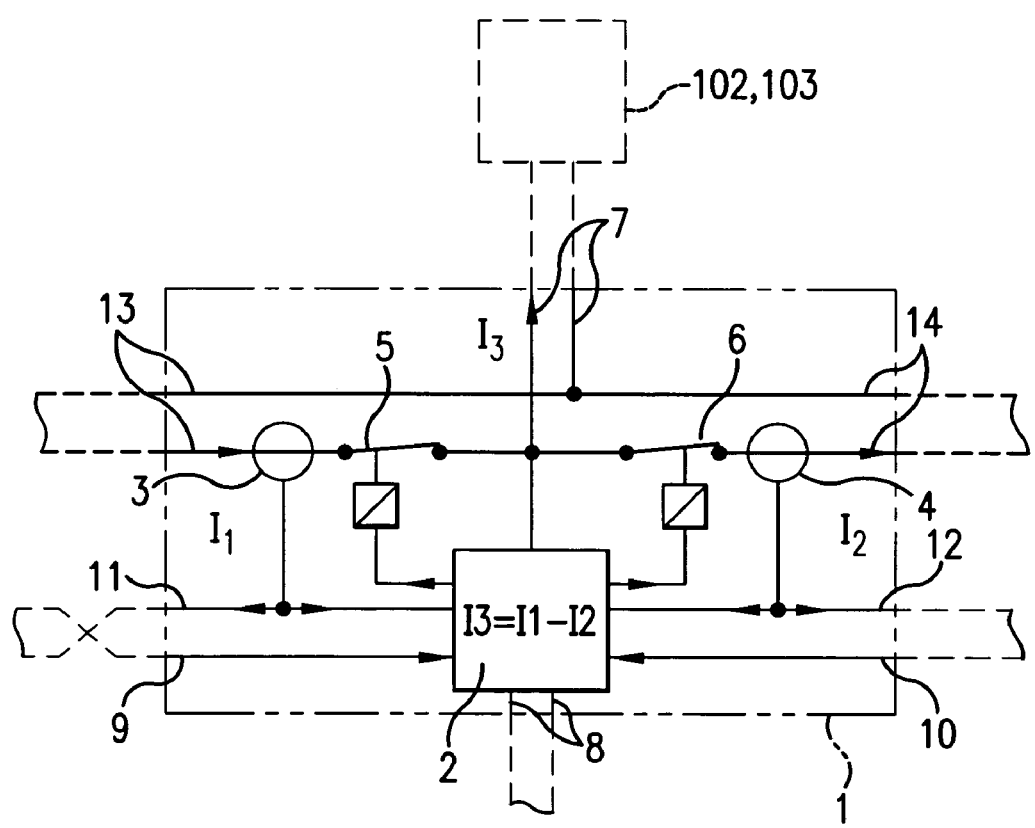
FIG. 4 is a schematic drawing showing how a pick up controller operates during failure (i.e., a short circuit).
Figure 5:
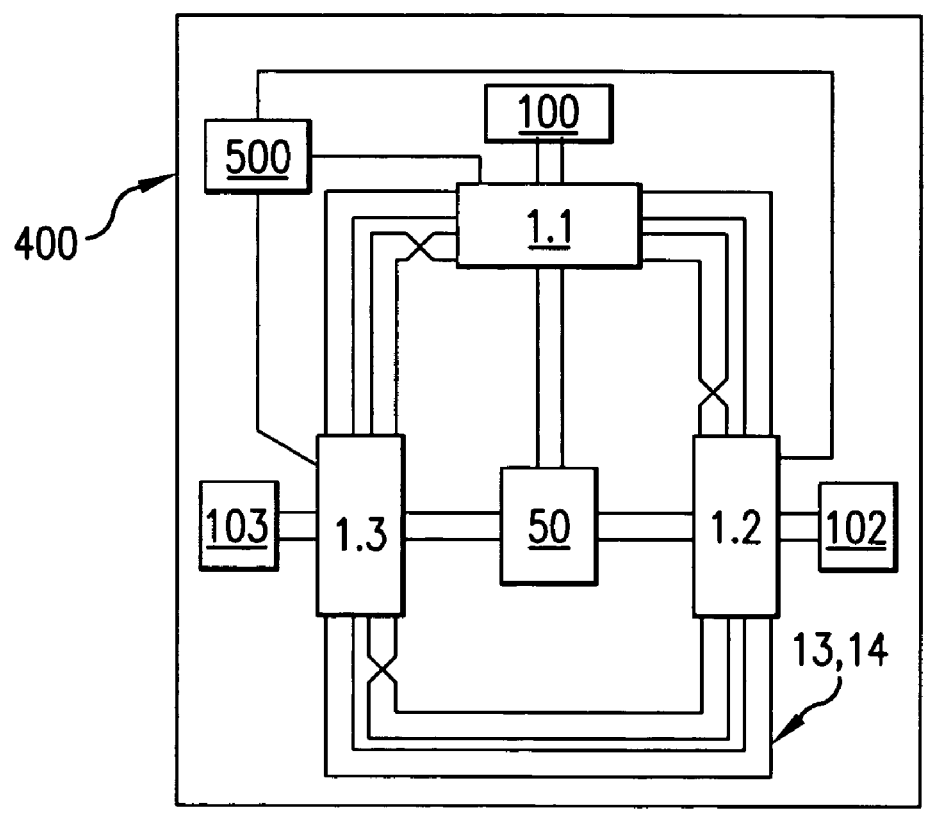
FIG. 5 is a schematic of a vehicle, either military or non-military, which incorporates a power ring in accordance with the present invention.

Each pick up controller 1.1, 1.2 and 1.3 has the same structure, and operates in the same way, as the pick up controller shown in FIGS. 1 and 4. Thus, as shown in FIG. 2, pick up controllers 1.1, 1.2 and 1.3 include paired pick ups 7.1, 7.2 and 7.3, respectively, that are connected to a power supply 100 and electrical consumers 102 and 103. While FIG. 2 shows one power supply and two electrical consumers connected to the power ring, the present invention could be practiced by connecting two power supplies and only one electrical consumer. In fact, those skilled in the art would recognize that the power ring 200 shown in FIG. 2, having three pick up controllers, is illustrative and not limiting. The present invention can be practiced wherein 2, 3, 4 or more pick up controllers are connected to the power ring, and each pick up controller is connected via a pick up pair to either a power supply or an electrical consumer.

As shown in FIG. 2, each pick up controller 1.1, 1.2 and 1.3 is connected to a signal line 8.1, 8.2 and 8.3 for sending failure or error signals to a failure indicator 50. In FIG. 2, only a single failure indicator 50 is shown for indicating failure or error, and this signal failure indicator can be a display panel, such as a computer display panel, that displays specific indicia representing different errors (i.e., short circuit, power surge, etc.) in the power ring circuit. On the other hand, as shown in FIG. 3, each pick up controller 1.1, 1.2 and 1.3 can be separately connected to a designated signal failure indicator 50.1, 50.2 and 50.3, respectively. In this case, each signal failure indicator 50.1, 50.2 and 50.3 can be a warning light (i.e., light bulb or LED) mounted on a display panel 60 of a military vehicle, or non-military vehicle.

FIG. 5 schematically illustrates a vehicle 400, which is either a military or non-military vehicle, and that includes a power ring in accordance with the present invention. As shown in FIG. 5, the pick up controllers 1.1, 1.2 and 1.3 can be connected to a higher order control device, such as master controller 500 that operates as a higher order control device for supervising and controlling the transmission of electrical power along the ring conductor 13, 14.

As mentioned, FIG. 3 illustrates a power ring 300 constructed with three pick up controllers, which is a similar electrical circuit as shown in FIG. 2, except that FIG. 3 shows electrical currents I1 and I2 flowing in the ring conductor and a short circuit S is illustrated as occurring in the line between conducting connections 13.3 and 14.2. In other words, the power ring shown in FIG. 3 is experiencing a failure (i.e., a short circuit) that is not present in the power ring shown in FIG. 2.

As shown in FIG. 4, electrical currents I1, I2 and I3 flow within the pick up controller 1 and determine the net current I3 available to power the electrical consumer 102 or 103 connected to the power ring at the pick up controller 1.

The pick up controller 1, as shown in FIG. 1, is constructed to include current sensors 3, 4 that enable measurement of electrical current strength and direction, respectively, for the electrical current on both sides A and B of the ring conductor 13, 14. Each side A, B of the ring conductor 13, 14 can be separated from the other by a switching element 5, 6, respectively. The power supply 100 for powering one or more electrical consumers (not shown is FIG. 1) is connected to line 7 (i.e., a wire pick up), for example. Thus, power is supplied to the power ring by connecting a power supply to paired pick up lines 7, which are connected to the ring conductor 13, 14. The power supply 100 is connected to the pick up pair 7 so that the connection between the power supply 100 and the ring conductor 13, 14 is located between the switching elements 5 and 6.

As evident from FIG. 2, by connecting together several pick up controllers, a power ring is constructed, for example, that includes a switch in each of the three controllers 1.1, 1.2, 1.3 (FIG. 2). Thus, in a failure situation, such as the short circuit S in the line between controllers 1.2 and 1.3 as shown in FIG. 3, the failing conductor segment can be unipolarly separated from the rest of the ring conductor by opening the corresponding switches 5.3 and 6.2. In this example, an "open" switch is a switch in an off state so that electricity is not conducted in the affected segment. In this way, the failure is isolated and further processed at a higher order position. In the normal operating situation, wherein there is no disruption in the ring conductor, the current strength in sensor signal line 11.3 measured by sensor 3.3 is as equally large as the current strength in sensor signal line 12.2 that is measured by sensor 4.2 (See FIG. 2). During a short circuit S, disturbance in the ring conductor between controllers 1.2 and 1.3, for example as demonstrated in FIG. 3, causes the measured electrical current values of current sensors 3.3 and 4.2 to vary in both current direction and/or current strength. This difference in these current values as measured by sensors 3.3 and 4.2 can be used by control units 2.3 and 2.2 to switch off switches 5.3 and 6.2, respectively; thereby isolating the short circuit S from the rest of the power ring circuit.

Current surge on the pick up of a pick up controller connected to one of the consumers 102 or 103 connected to the lines 7.2 or 7.3, respectively, can also be recognized by employing a differentiation of current values measured by sensors 3 and 4 (See FIG. 4). The current values in lines 11 and 12, as measured by the current sensors 3 and 4 respectively, are evaluated by the control unit 2. In-flowing or out-flowing currents are subtracted from one another in accordance with their direction as evident from FIG. 4. The result of combining the in-flowing and out-flowing electrical currents is that the net strength of the out-flowing or in-flowing current in conductor 13 will be observed at the paired pick ups 7. In the event that there is a surge of an in-coming current peak value in the circuit, the current uptake in pick-up 7 can be interrupted by means of the associated switches 5, 6 in the same manner as described above for a short circuit, thereby protecting the connected electrical consumer 102 or 103 from damage due to current surge.

In accordance with another embodiment of the present invention, as shown in FIG. 1, the control unit 2 for each pick up controller can include a device 2a for voltage measurement (i.e., a volt meter) and a device 2b for conduction protection with status indication (e.g. a surge protector). In this embodiment, the control unit 2 may be interconnected with the control units of neighboring pick up controllers 1.1, 1.2, 1.3, such as demonstrated in FIGS. 2 and 5, to form an integrated intelligent control unit. Optionally, the integrated intelligent control unit may include a master controller 500 connected to each of the pick up control units as evident from FIGS. 1 and 5.

In accordance with the present invention, a power supply 100 can be either a conventional battery constructed for use in a vehicle, or the power supply could be an electric generator powered by the vehicle's engine. The electrical consumers 102, 103 can be any electrically powered system carried by a military or non-military vehicle, and may include, but is not limited to: internal lighting, external lighting (blinkers, headlights, flood lights), internal global positioning systems, guidance systems, weapons systems, communications systems, air conditioning systems, heating systems, ventilation systems, and the like.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. A power ring device in a military vehicle for supplying electrical power to electrical consuming devices of the vehicle, the power ring device comprising:
(a) a ring conductor;
(b) a plurality of controllers operating as control and switching devices, wherein each controller is connected to the ring conductor and each controller includes a first control unit;
(c) a plurality of paired pick ups disposed on the ring conductor, wherein each pair of pick ups connects either an electrical consumer device or an electrical power supply to the ring conductor and to one of the plurality of controllers, wherein a first pair of pick ups of a first controller is connected to a first power supply; and
(d) a plurality of current sensor signal lines connecting each control unit of the plurality of controllers so as to form a data connection between the controllers that supervise and control transmission of electrical power along the ring conductor; wherein each controller further comprises:
i. a right side and a left side, and each controller includes a right sided switch element and a left sided switch element connected to the control unit and the ring conductor; and
ii. a right sided current sensor and a left sided current sensor connected to the ring conductor, to the first control unit, and to the plurality of current sensor signal lines so that a first current value measured by the left sided current sensor of the first controller is transmitted as data to the first control unit of a second controller,
wherein each controller includes one pair of pick ups forming a connection to the ring conductor and to a component selected from the group consisting of an electrical consumer, a power supply, and the first power supply, so that the right sided switch element is connected to the ring conductor to the right of the connection, and the left sided switch element is connected to the ring conductor to the left of the connection, and
wherein the right sided switch element is connected to the ring conductor between the right sided current sensor and the one pair of pick ups, and the left sided switch element is connected to the ring conductor between the left sided current sensor and the one pair of pick ups.

2. A vehicle comprising:
(A) a first power supply;
(B) one or more electrical consuming devices; and
(C) a power ring device connected to receive electrical power from the first power supply and connected to transmit electrical power to the one or more electrical consuming devices, the power ring device comprising:
i. a ring conductor;
ii. a plurality of controllers operating as control and switching devices, wherein each controller is connected to the ring conductor and each controller includes a first control unit;
iii. a plurality of paired pick ups disposed on the ring conductor, wherein each pair of pick ups connects either an electrical consumer device or an electrical power supply to the ring conductor and to one of the plurality of controllers, wherein a first pair of pick ups of a first controller is connected to the first power supply; and
iv. a plurality of current sensor signal lines connecting each control unit of the plurality of controllers so as to form a data connection between the controllers that supervise and control transmission of electrical power along the ring conductor;
wherein each controller further comprises:
a. a right side and a left side, and each controller includes a right sided switch element and a left sided switch element connected to the control unit and the ring conductor; and
b. a right sided current sensor and a left sided current sensor connected to the ring conductor, to the first control unit, and to the plurality of current sensor signal lines so that a first current value measured by the left sided current sensor of the first controller is transmitted as data to the first control unit of a second controller,
wherein the control units of the plurality of controllers operate together as control nodes to provide an intelligent control unit for controlling the transmission of electrical power from the first power supply to a first current consumer connected by a second pair of pick ups of a second controller to the ring conductor, wherein the intelligent control unit operates to maintain stable transmission of electrical power to the first current consumer by isolating an electrical disturbance in the ring conductor, wherein the electrical disturbance is either a short circuit or a power surge,
wherein each controller includes one pair of pick ups forming a connection to the ring conductor and to a component selected from the group consisting of an electrical consumer, a power supply and the first power supply so that the right sided switch element is connected to the ring conductor to the right of the connection and the left sided switch element is connected to the ring conductor to the left of the connection, wherein the intelligent control unit includes a master controller connected to send control signals to each first control unit, and wherein the right sided switch element is connected to the ring conductor between the right sided current sensor and the one pair of pick ups, and the left sided switch element is connected to the ring conductor between the left sided current sensor and the one pair of pick ups.

3. A vehicle according to claim 2, wherein the right sided current sensor and the left sided current sensor of each pick up controller are disposed for measuring electrical current values in conducting lines of the ring conductor and the one pair of pick ups.

4. A vehicle according to claim 3, wherein each first control unit comprises a device for voltage measurement and a device for conduction protection with status indication.

5. A vehicle according to claim 2, wherein the vehicle is a military vehicle.

* * * * *